July 3, 1928.  1,675,760
C. W. MANZEL
HYDRAULIC SHOCK ABSORBER
Filed May 6, 1926  2 Sheets-Sheet 1
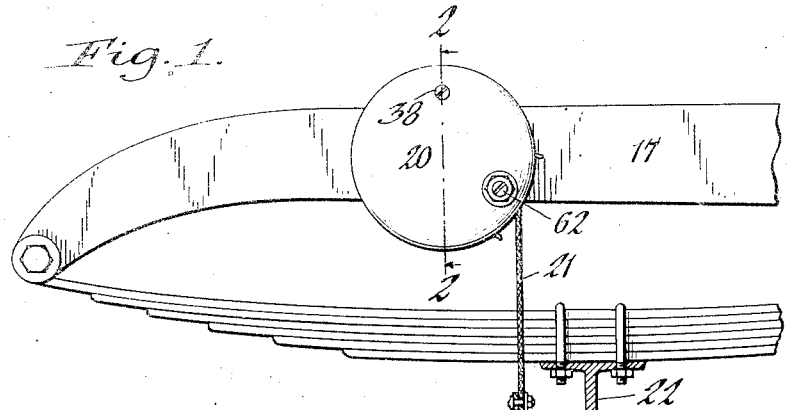
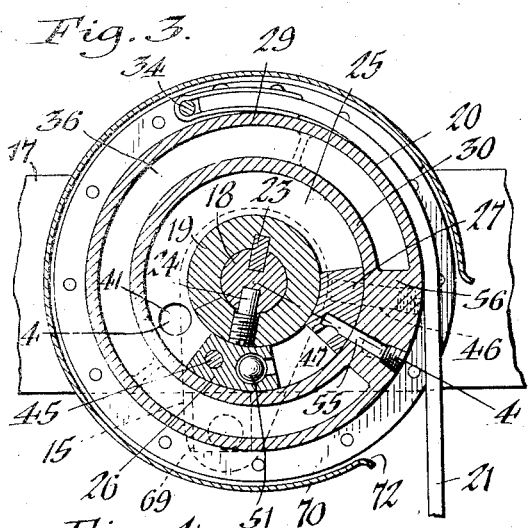
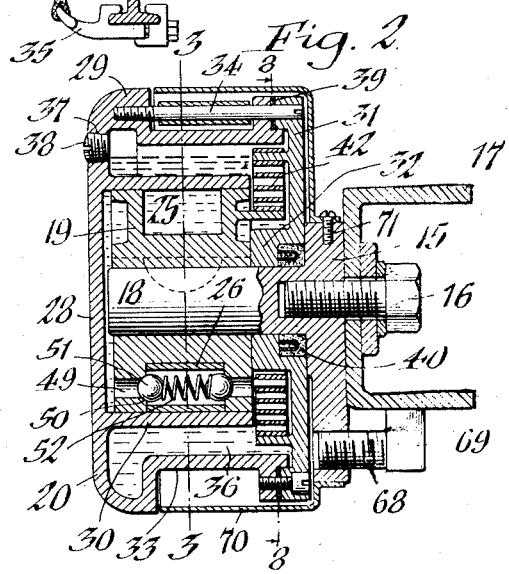
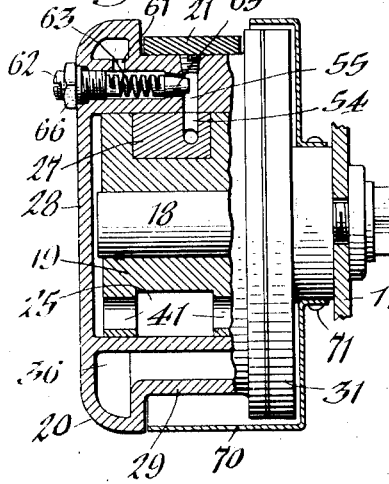
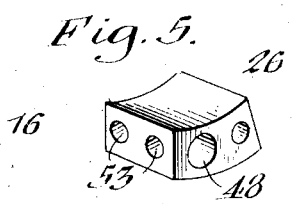
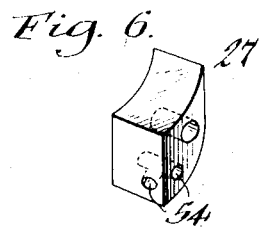
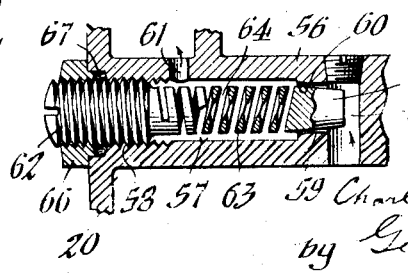
Inventor,
Charles W. Manzel,
by Geyer & Geyer
Attorneys.

July 3, 1928.

C. W. MANZEL 1,675,760

HYDRAULIC SHOCK ABSORBER

Filed May 6, 1926  2 Sheets-Sheet 2

Inventor,
Charles W. Manzel,
by Geyer & Geyer
Attorneys.

Patented July 3, 1928.

UNITED STATES PATENT OFFICE.

CHARLES W. MANZEL, OF BUFFALO, NEW YORK.

HYDRAULIC SHOCK ABSORBER.

Application filed May 6, 1926. Serial No. 107,065.

This invention relates to a shock absorber which is particularly intended for use on automobiles and other vehicles.

Its chief objects are to provide an improved shock absorber of the rotary hydraulic type which will effectually check the rebound action of the vehicle springs and insure easy and comfortable riding to the occupants of the vehicle, and which is designed for universal adaptation to the various makes of automobiles now on the market.

Another object of the invention is the provision of a simple and inexpensive shock absorber of this character which is strong and durable in construction, which is reliable in operation and not liable to get out of order, and which can be readily and quickly installed on the vehicle.

Figure 8:
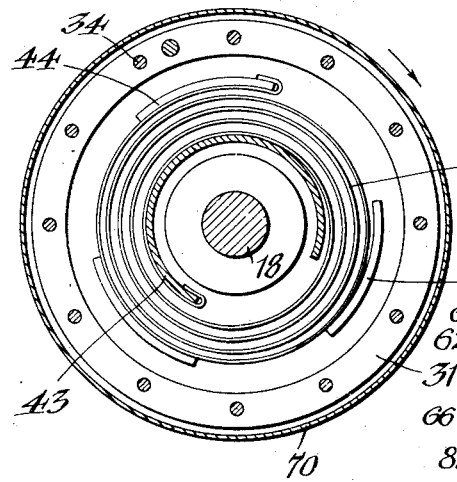
Figures 9, 12:
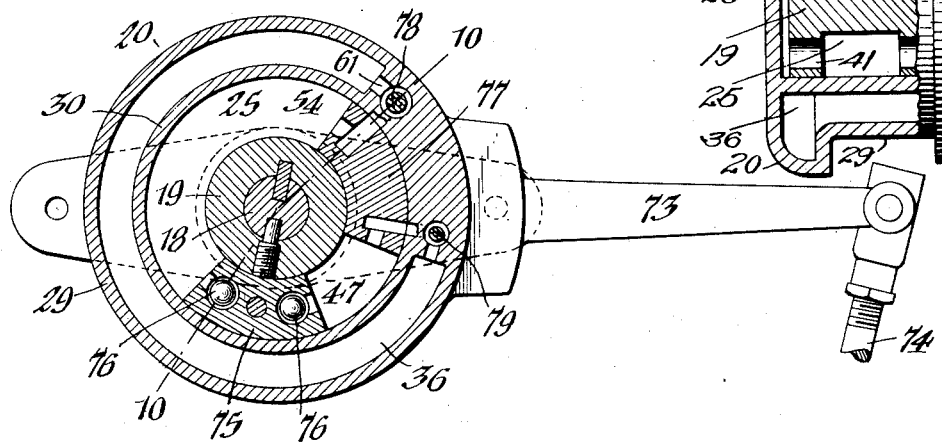
Figure 10:
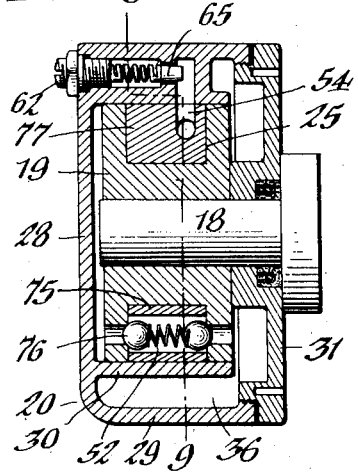
Figure 11:
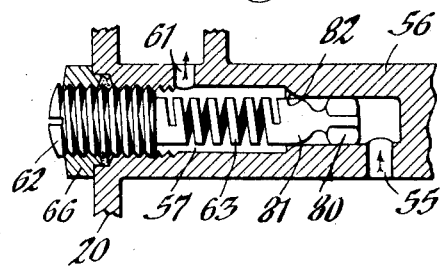

In the accompanying drawings:

Figure 1 is a side elevation of the invention applied to a motor vehicle. Figure 2 is an enlarged transverse section thereof on line 2—2, Fig. 1. Figure 3 is a vertical section thereof on line 3—3, Fig. 2. Figure 4 is a transverse section taken substantially in the plane of line 4—4, Fig. 3. Figures 5 and 6 are perspective views of the stator and rotor blades, respectively. Figure 7 is an enlarged detailed section of the regulating outlet valve. Figure 8 is a vertical section on line 8—8, Fig. 2. Figure 9 is a vertical section of a modified form of the improvement taken in the plane of line 9—9, Fig. 10. Figure 10 is a transverse section on line 10—10, Fig. 9. Figure 11 is a view similar to Fig. 7 showing a modification of the regulating valve. Fig. 12 is a section similar to Fig. 4 showing the valve of Fig. 11.

Similar characters of reference indicate corresponding parts throughout the several views.

In the preferred embodiment of the invention shown in Figs. 1–8, inclusive of the drawings, 15 indicates a supporting bracket fastened by a bolt 16 to the vehicle-frame 17 and having a horizontal stud or stub-shaft 18 projecting forwardly therefrom. Mounted on this stub-shaft is the stationary element or stator 19 of the device and applied to and surrounding the stator is a rotating element or rotor 20 connected by a flexible strap 21 with the axle 22 of the vehicle.

The stator is secured to the stud 18 by a key 23 and pin 24 which prevent both circumferential and longitudinal movement of the stator relative to the stud. Formed between the stator and the rotor and preferably by the provision of an annular groove in the periphery of the stator, an operating chamber 25 is produced in which a stator-blade 26 and a rotor blade 27 are arranged for relative circumferential movement.

The rotor is of cylindrical form and consists of a casing or housing having a solid front wall 28, an outer cylindrical wall 29 and an inner concentric wall or bearing sleeve 30 which engages and is rotatably mounted on the stator 19, as shown in Fig. 2. Applied to the open rear end of the rotor is a cover plate 31 whose central portion or hub 32 is disposed between the opposing faces of the bracket 15 and stator 19, whereby lateral displacement of the rotor on the stator is prevented. In its exterior face, the outer wall of the rotor has an annular groove 33 in which the strap 21 is guided, the upper end of the latter being fastened to the rotor by a pin 34 while its lower end is attached to a suitable fitting 35 applied to the axle, as shown in Figs. 1 and 3. The rear end of the inner rotor-wall terminates short of the cover plate and a resulting oil reservoir or replenishing chamber 36 is produced which includes the annular space between the concentric walls 29, 30, the lateral space between the cover plate and the rotor, and the space between the latter and the front wall 28 of the rotor. This reservoir is filled with a fluid such as oil or glycerine, through a suitable opening 37 normally closed by a plug 38. The oil level is indicated in Fig. 2 and is such as to provide an air space above it to permit the proper functioning of the device. Leakage of oil from the reservoir is prevented by packings 39, 40 placed between the outer wall of the rotor housing and cover plate and between the stator-bracket and cover plate hub, respectively. The blade-channel 25 is in constant communication with the reservoir through ports 41 formed in its opposite side walls and located at a point near the end of the counter-clockwise stroke of the rotor-blade 27, as shown in Fig. 4.

A spiral spring 42 is employed for automatically winding up any slack in the strap 21 and maintaining it taut. This spring is located in the oil reservoir within the lateral space between the rotor 20 and cover plate 31 and enclosed within arcuate flanges 43, 44 formed thereon, the outer and inner ends of the spring being suitably fastened to the corresponding flanges, as shown in Figs. 2 and 8. The spiral spring tends to turn the rotor in a counter-clockwise direction, as when the vehicle-body approaches the axle due to a sudden bump or other defect in the road.

The blades 26, 27 are preferably in the form of segmentally-shaped blocks, as shown in Figs. 3, 5 and 6 and occupy the full cross-sectional area of the operating chamber 25. The stator blade 26 is disposed in the lower side of the channel and is fixed to the stator 19 by a transverse pin 45, while the rotor blade 27 is fastened by a radial pin 46 with the rotor 20 and is movable in a circular path toward and from said stator blade. In the normal position of the shock absorber shown in the drawings, the rotor blade is located at one side of and spaced a suitable distance from the stator-blade, both blades having valve-controlled ports for admitting and expelling oil to and from the operating end or portion 47 of the chamber 25. To this end, the stator blade has a transverse oil passage 48 which communicates at its ends with alining inlet ports 49 in the stator, the opposing inner ends of such inlet ports having valve seats 50 against which suction valves 51 are normally held by a comparatively light spring 52 interposed between them, as shown in Fig. 2. In its end wall, this stator blade has a pair of ports 53 which intersect the passage 48 and establish communication between the latter and the operating portion 47 of the chamber 25. Thus, when the rotor is moved in a counter-clockwise direction, as when the vehicle-body approaches the axle, a partial vacuum is created in the channel-portion 47, opening the valves 51 and allowing oil to be quickly drawn from the reservoir 36 into said channel-portion through the ports 49, the passage 48 and the ports 53. The oil in the remaining or low pressure portions of the chamber 25 between the advancing face of the rotor blade and the opposing face of the stator blade is discharged into the reservoir through the ports 41.

The rotor blade 27 has an angle-shaped oil outlet port 54 one end of which opens into the operating end 47 of the oil channel 25 while the other end communicates with a radial passage 55 in the adjoining bridge wall 56 connecting the concentric walls 29, 30 of the rotor 20, as shown in Figs. 3 and 4. Arranged transversely of this bridge wall is an opening 57 having a threaded outer portion 58 and terminating at its inner end in a port 59 opening into the passage 55 and having a tapered valve-seat 60. A port 61 connects the opening 57 with the oil reservoir 36. Adjustable lengthwise of the opening 57 is a pressure-controlled, regulating valve for controlling the expulsion of oil from the operating portion 47 of the channel 25 when the rotor is turned in a clockwise direction to absorb the shocks incidental to the vehicle encountering a bump in the road. This valve preferably consists of a threaded head 62 engaging the threaded-opening 58, a yieldable stem 63 formed by milling a spiral slot 64 therein, and a tapered valve-plug 65 arranged to enter the port 59 for regulating the discharge of oil therethrough in accordance with the pressure created in the oil channel. By milling the spiral slot in the stem, a self-contained, normally neutralized spring is formed thereon, whereby the valve-plug is permitted to open its port 59 more or less, each coil of the spring responding uniformly to the oil-pressure exerted on said plug. This spring-valve is set at a predetermined tension depending on the pressure desired for a given installation, the adjustment being effected by screwing the valve toward or from its valve seat 60 and locking it in a set position by the lock-nut 66. Leakage of oil past the threaded end of the valve-stem is prevented by a suitable packing 67.

This regulating valve constitutes the controlling element of the shock absorber in that it governs the flow or passage of fluid from the operating chamber into the reservoir and automatically proportions the hydraulic resistance to the intensity or severity of the shock resulting from the vehicle striking a bump or other obstruction in the roadway. While effectually checking the rebound of the vehicle-body in this manner, the tensioned valve allows the discharge of fluid from the operating chamber 25 at a rate to effect the prompt return of the vehicle springs to their normal position.

For the purpose of adjusting the stator-bracket 15 in place on the vehicle-frame 17 to suit various installations and also to rigidly hold it against turning, its lower end is provided with a stud bolt 68 having a square head 69, one or another of whose faces is adapted to bear against the underside of said vehicle-frame in the manner shown in Figs. 2 and 3. It will be noted that the faces of the bolt-head are located at different radial distances from the axis to obtain the adjustments desired.

Extending around and over the rear side of the rotor is a hood 70 which may be fastened by screws 71 to the stator-bracket 15, as shown in Fig. 2. In its side, this hood has an opening 72 through which the strap 21 passes.

The operation of the device is as follows:—

Normaly, the stator- and rotor-blades and associated parts assume the position shown in the drawings. When the vehicle-body and axle approach each other due to a bump, obstruction or other defect in the road, the spiral spring 42 causes the rotor 20 to turn in a counter-clockwise direction and wind the resulting slack in the strap 21 thereon. During the turning of the rotor in this direction, its blade 27 is carried with it, the oil contained in that portion of the chamber 25 in advance of said blade being displaced through the ports 41 into the reservoir 36, while the operating portion 47 of such channel is supplied with oil from the reservoir through the valve-ports 49, passage 48 and ports 53. When the vehicle-body and axle recede from each other to assume their normal relative positions, the shock-absorbing qualities of the apparatus to check the rebound of the body are brought into play, the return movement of the rotor being resisted by the oil in the operating end 47 of the chamber 25 which oil is expelled into the reservoir at a predetermined pressure through the blade-port 54, passage 55, port 59 controlled by the regulating valve 65, opening 57 and port 61.

In the modified form of the invention disclosed in Figs. 9 and 10, an actuating arm 73 and link 74 is employed instead of the strap 21, the arm being attached to the rotor and the link to the axle. In this case, the device is double-acting, the oil in the operating chamber 25 resisting the turning action of the rotor in both directions. To this end, the stator blade 75 has two sets of ball valves 76 for controlling the admission of oil to the operating chamber and the rotor-blade 77 has two regulating valves 78, 79 for controlling the discharge of oil therefrom. The valve 78, which is somewhat larger than the valve 79, regulates the discharge of oil during the turning of the rotor in an upward or counter-clockwise direction, while the smaller valve 79 regulates the discharge of oil on the return movement of the rotor. Furthermore, the yieldable stem of the larger valve 78 is set at a less tension than that of the smaller valve 79, so that the resistance offered to the movement of the rotor in a counter-clockwise direction is less than that offered on the return or clockwise movement of the rotor.

In the modified form of the controlling valve shown in Fig. 11, the same is provided in rear of its triangular, ported guide head 80 with a choke-piston 81 adapted to slide into the convexly-curved choke port 82 for automatically controlling the fluid pressure through the port in proportion to the severity of each shock.

I claim as my invention:—

1. A shock absorber, comprising a stator, a rotor mounted on said stator and containing a fluid reservoir, an operating chamber communicating with said reservoir and formed between the bearing faces of the stator and rotor, respectively, cooperating blades carried by said last-named parts and arranged in said operating chamber, and means for automatically controlling the admission and expulsion of the fluid to and from the operating chamber.

2. A shock absorber, comprising a stator, a rotor mounted on said stator and containing a fluid reservoir, an operating chamber communicating with said reservoir and formed between the bearing faces of the stator and rotor, respectively, cooperating blades carried by said last-named parts and arranged in said operating chamber, the stator and rotor and their respective blades having ports for establishing communication between the reservoir and said operating chamber, and means for controlling the passage of fluid through said ports.

3. A shock absorber, comprising a stator, a rotor mounted on said stator and containing a fluid reservoir, an annular operating chamber disposed between the bearing faces of the stator and the rotor, blades carried by said last-named parts and arranged in said operating chamber, means for controlling the admission of fluid from said reservoir to the operating chamber when the rotor is turned in one direction, and regulatable means for controlling the discharge of fluid from said operating chamber when the rotor is turned in the reverse direction.

4. A shock absorber, comprising a stator, a rotor mounted on said stator and containing a fluid reservoir surrounding the same, an annular operating chamber disposed between the bearing faces of the stator and the rotor, blades carried by said last-named parts and arranged radially of said operating chamber, the stator and its blade and the rotor and its blade having intercommunicating ports for the passage of fluid from the reservoir into the operating chamber and from the latter to the former, respectively, and means for controlling the flow of fluid through said ports.

5. A shock absorber, comprising a stator, a rotor mounted on said stator and containing a fluid reservoir surrounding the same, an annular operating chamber disposed between the bearing faces of the stator and the rotor, blades carried by said last-named parts and arranged radially of said operating chamber, the stator and its blade and the rotor and its blade having intercommunicating ports for the passage of fluid from the reservoir into the operating chamber and from the latter to the former, respectively, a valve applied to the stator-blade ports for controlling the flow of fluid into the operating chamber when the rotor is turned in one direction, and a valve applied to the rotor-blade ports for regulating the discharge of fluid from said operating chamber when the rotor is turned in the reverse direction.

6. A shock-absorber, comprising a stator, a rotor mounted on said stator and containing a fluid reservoir surrounding the same, an annular operating chamber disposed between the bearing faces of the stator and the rotor, blades carried by said last-named parts and arranged radially of said operating chamber, the stator and its blade and the rotor and its blade having intercommunicating ports for the passage of fluid from the reservoir into the operating chamber and from the latter to the former, respectively, a valve applied to the stator-blade ports for controlling the flow of fluid into the operating chamber when the rotor is turned in one direction, and a valve applied to the rotor-blade ports for regulating the discharge of fluid from said operating chamber when the rotor is turned in the reverse direction, said discharge valve having a tensioned stem for regulating its opening and closing movements.

7. A shock absorber, comprising a stator, a rotor mounted on said stator and containing a fluid reservoir surrounding the same, an annular operating chamber disposed between the bearing faces of the stator and the rotor, blades carried by said last-named parts and arranged radially of said operating chamber, the stator and its blade and the rotor and its blade having intercommunicating ports for the passage of fluid from the reservoir into the operating chamber and from the latter to the former, respectively, a valve applied to the stator-blade ports for controlling the flow of fluid into the operating chamber when the rotor is turned in one direction, and a valve applied to the rotor-blade ports for regulating the discharge of fluid from said operating chamber when the rotor is turned in the reverse direction, said discharge valve being adjustable toward and from its valve-seat and including a threaded-head at one end, a valve-plug at its opposite end and an intermediate yieldable stem of a predetermined tension to resist the opening of said plug.

8. A shock absorber for vehicles, comprising a stator adapted to be supported on the vehicle-frame, a rotor containing a fluid reservoir mounted on said stator and adapted to be flexibly connected to the vehicle-axle, an operating chamber disposed between the bearing faces of the stator and the rotor, blades carried by said last-named parts and arranged in said operating chamber, means for controlling the admission of fluid from said reservoir to the operating chamber when the rotor is turned in one direction, means for constantly urging said rotor in such direction, and regulatable means for controlling the discharge of fluid from said operating chamber when the rotor is turned in the reverse direction.

9. A shock absorber for vehicles, comprising a stator adapted to be supported on the vehicle-frame, a rotor containing a fluid reservoir mounted on said stator and adapted to be flexibly connected to the vehicle-axle, the rotor including a cylindrical casing closed at its front side, a cover plate applied to its rear side and arranged to form an annular space constituting a part of said reservoir between said cover and the opposite side of the stator, an operating chamber disposed between the bearing faces of the stator and the rotor, blades carried by said last-named parts and arranged in said operating chamber, means for controlling the admission of fluid from said reservoir to the operating chamber when the rotor is turned in one direction, a spiral spring arranged in said annular space and connected at its ends to the stator and the rotor for constantly urging the latter in such direction, and regulatable means for controlling the discharge of fluid from said operating chamber when the rotor is turned in the reverse direction.

10. A shock absorber, comprising a stator, a rotor mounted on said stator and containing a fluid reservoir, said rotor including a cylindrical casing having inner and outer concentric walls, a front wall and a cover plate, an annular operating chamber disposed between the bearing faces of the stator and the inner wall of said rotor-casing, blades carried by the rotor and the stator and arranged in said operating chamber, and means for automatically controlling the charging and discharging of the fluid to and from the operating chamber.

11. A shock absorber, comprising a stator having an annular groove in its periphery, a rotor mounted on said stator and containing a fluid reservoir, said rotor including a cylindrical casing having inner and outer concentric walls, a front wall and a cover plate, said inner wall engaging the stator and forming with its groove an operating chamber adapted to communicate with said reservoir, blades carried by the rotor and the stator and arranged in said operating chamber, and means for automatically controlling the charging and discharging of the fluid to and from said chamber.

12. A shock absorber, comprising a stator having an annular groove in its periphery, a rotor mounted on said stator and containing a fluid reservoir, said rotor including a cylindrical casing having inner and outer concentric walls, a front wall and a cover plate, said inner wall engaging the stator and forming with its groove an operating chamber adapted to communicate with said reservoir, blades carried by the rotor and the stator and arranged in said operating chamber, said stator and its blade having interconnecting ports for establishing communication between the reservoir and said chamber when the rotor is turned in one direction, a valve applied to said stator-blade for controlling said ports, said rotor and its blade having interconnecting ports for establishing communication between the operating chamber and said reservoir when the rotor is turned in the reverse direction, and a valve applied to the rotor for controlling said last-named ports.

13. A shock absorber, comprising a stator having an annular groove in its periphery, a rotor mounted on said stator and containing a fluid reservoir, said rotor including a cylindrical casing having inner and outer concentric walls, a front wall and a cover plate, said inner wall engaging the stator and forming with its groove an operating chamber adapted to communicate with said reservoir, blades carried by the rotor and the stator and arranged in said operating chamber, said stator-blade having a transverse valve-passage having intersecting ports opening into the operating chamber and the side walls of said stator-groove having transverse ports in line with said blade-passage, inwardly-opening check valves arranged in said passage and normally seated against the stator-ports, said valves being opened to admit fluid to the operating chamber when the rotor is turned in one direction, and means for controlling the discharge of fluid from said chamber when the rotor is turned in the reverse direction.

14. A shock absorber comprising a stator, a rotor mounted on said stator and containing a fluid reservoir, an annular operating chamber disposed between the bearing faces of the stator and the rotor, blades carried by said last-named parts and arranged in said operating chamber, means for controlling the admission of fluid from said reservoir to the operating chamber when the rotor is turned in one direction, and regulatable means for controlling the discharge of fluid from said operating chamber when the rotor is turned in the reverse direction, said regulatable means comprising a transverse passage extending inwardly from the front wall of the rotor and terminating at its inner end in a valve seat, said passage being connected by ports with said reservoir and said operating chamber, and an adjustable valve arranged in said passage and having a normally tensioned valve-plug at its inner end engageable with said seat.

15. A shock absorber for vehicles, comprising a bracket having a supporting stud adapted for attachment to the vehicle-frame, a stator fixed on said stud, a rotor journaled on said stud and containing a fluid reservoir, the front end of said rotor being closed and its rear end being open, a cover applied to the open end of the rotor and having its central portion disposed between the opposing faces of said bracket and said stator, an operating chamber formed between the bearing faces of the stator and the rotor and in communication with the reservoir, blades carried by said last-named parts and arranged in the operating chamber, and means for controlling the admission and expulsion of the fluid to and from said chamber.

16. The combination with the side frame and axle of an automobile, of a bracket attached to said frame and extending below the same, an adjusting element mounted on the extended portion of said bracket and bearing against the underside of the frame for setting the bracket in a plurality of different positions on the frame, and a shock absorbing device supported on said bracket and operatively connected to the axle.

17. The combination with the side frame and axle of an automobile, of a bracket attached to said frame and extending below the same, a bolt mounted on the extended portion of the bracket, the head of the bolt having its faces arranged at different radial distances from the axis thereof, one or another of such faces being adapted to bear against the underside of the frame, and a shock absorbing device supported on said bracket and operatively connected to the axle.

18. In a shock absorber, the combination with a vehicle frame and axle, of a stator mounted on the frame, a rotor journaled on the stator and containing a fluid reservoir, an operating chamber disposed between the stator and the rotor and communicating with said reservoir, blades carried by the stator and rotor and arranged in said chamber, means for automatically controlling the admission and expulsion of fluid to and from the operating chamber, and a flexible member connecting said rotor with the axle.

19. A shock absorber for vehicles, comprising a stator, a rotor mounted on said stator and containing a fluid reservoir, an operating chamber disposed between the stator and the rotor and communicating with said reservoir, blades carried by the stator and rotor and arranged in said chamber, means for controlling the admission of fluid to the operating chamber when the stator is turned in one direction, and means for automatically governing the flow of fluid from said chamber when the stator is turned in the reverse direction, said automatic means controlling the shock absorbing action and proportioning the hydraulic resistance to the intensity of the shocks encountered.

20. The combination with an hydraulic shock absorber having a passage for the discharge of fluid under pressure, of a regulating valve for controlling the discharge of fluid through said passage and including an adjustable head at one end, a valve-plug at its opposite end, and a normally neutralized yieldable element of a predetermined tension disposed between said head and said valve-plug for resisting the opening of the latter.

21. The combination with an hydraulic shock absorber, having a passage for the discharge of fluid under pressure, of a regulating valve for controlling the discharge of fluid through said passage and including an adjustable head at one end, a valve-plug at its opposite end, and an intermediate member connecting said aforesaid parts and having a spirally-milled slot therein forming a yieldable stem for resisting the opening of said valve-plug.

22. The combination with an hydraulic shock absorber, having a passage including a choke port for the discharge of fluid under pressure, of a regulating valve for controlling the discharge of fluid through said passage including an adjustable head at one end, a ported piston-valve at its opposite end guided in said choke-port, and an intermediate yieldable stem connecting said piston-valve with said head.

23. A shock absorber for vehicles, comprising a stator having an annular groove therein, a rotor mounted on said stator and containing a fluid reservoir, one of the walls of the rotor extending over the stator-groove and forming therewith an operating chamber adapted to communicate with said reservoir, blades carried by the rotor and the stator and arranged in said operating chamber, and means for automatically controlling the charging and discharging of the fluid to and from said chamber.

24. The combination with an hydraulic shock absorber having a passage for the discharge of fluid under pressure, of a regulating valve for controlling the discharge of fluid through said passage and including an adjustable head at one end, a valve plug at its opposite end, and a normally neutralized yieldable element disposed between and connecting said head and said valve plug to form a unitary structure.

CHARLES W. MANZEL.